US010228274B2

(12) United States Patent
Lin et al.

(10) Patent No.: US 10,228,274 B2
(45) Date of Patent: Mar. 12, 2019

(54) LIQUID LEVEL SENSING APPARATUS FOR LONG-DISTANCE AUTOMATICALLY ENHANCING SIGNAL-TO-NOISE RATIO

(71) Applicant: FINETEK Co., Ltd., New Taipei (TW)

(72) Inventors: I-Chu Lin, New Taipei (TW); Yao-Chen Yu, New Taipei (TW); Chao-Kai Cheng, New Taipei (TW); Yi-Liang Hou, New Taipei (TW)

(73) Assignee: FINETEK CO., LTD., New Taipei (TW)

( * ) Notice: Subject to any disclaimer, the term of this patent is extended or adjusted under 35 U.S.C. 154(b) by 319 days.

(21) Appl. No.: 15/263,778

(22) Filed: Sep. 13, 2016

(65) Prior Publication Data

US 2018/0073909 A1 Mar. 15, 2018

(51) Int. Cl.
*G01F 23/284* (2006.01)
*G01S 7/00* (2006.01)
*H01Q 1/22* (2006.01)
*H01Q 13/02* (2006.01)
*G01S 7/02* (2006.01)

(52) U.S. Cl.
CPC ........... *G01F 23/284* (2013.01); *G01S 7/003* (2013.01); *H01Q 1/225* (2013.01); *H01Q 13/02* (2013.01); *H01Q 13/0266* (2013.01); *G01S 2007/027* (2013.01)

(58) Field of Classification Search
CPC .............................. G01F 23/284; G01S 7/003
USPC ....................................................... 342/124
See application file for complete search history.

(56) References Cited

U.S. PATENT DOCUMENTS

| 5,148,177 | A  | * | 9/1992 | Nagamune | ............. | B22D 2/003 |
|           |    |   |        |          |              | 342/124    |
| 6,107,957 | A  | * | 8/2000 | Cramer   | ................. | G01F 23/284 |
|           |    |   |        |          |              | 342/124    |
| 6,995,706 | B2 | * | 2/2006 | Ohlsson  | ................ | G01F 23/284 |
|           |    |   |        |          |              | 342/118    |
| 7,173,436 | B2 | * | 2/2007 | Edvardsson | .......... | G01F 23/284 |
|           |    |   |        |          |              | 324/644    |
| 7,408,501 | B2 | * | 8/2008 | Rolfes   | ................... | G01F 23/284 |
|           |    |   |        |          |              | 342/124    |
| 7,561,113 | B2 | * | 7/2009 | Lenk     | ...................... | G01F 23/284 |
|           |    |   |        |          |              | 324/644    |
| 7,952,514 | B2 | * | 5/2011 | Nilsson  | ..................... | G01S 7/02  |
|           |    |   |        |          |              | 342/124    |

(Continued)

*Primary Examiner* — Marcus E Windrich
(74) *Attorney, Agent, or Firm* — Chun-Ming Shih; HDLS IPR Services

(57) ABSTRACT

A liquid level sensing apparatus (10) for long-distance automatically enhancing a signal-to-noise ratio is applied to a measured target (20). The liquid level sensing apparatus (10) includes a sensing module (102), a long-distance command receiving module (104) and at least a brake module (106). The sensing module (102) transmits a sensing signal (108) to the measured target (20). The sensing signal (108) touches the measured target (20) to reflect back a reflected signal (110). The sensing module (102) receives the reflected signal (110) to measure the signal-to-noise ratio and to measure a height of the measured target (20). The long-distance command receiving module (104) is electrically connected to the sensing module (102). The long-distance command receiving module (104) receives a long-distance command signal (302). The brake module (106) is mechanically connected to the sensing module (102).

5 Claims, 14 Drawing Sheets

(56) References Cited

U.S. PATENT DOCUMENTS

| | | | | |
|---|---|---|---|---|
| 8,159,386 B2* | 4/2012 | Malinovskiy | ......... | G01F 23/284 |
| | | | | 342/118 |
| 8,639,457 B2* | 1/2014 | Hammer | ............... | G01F 23/284 |
| | | | | 342/124 |
| 8,854,253 B2* | 10/2014 | Edvardsson | ............ | G01S 13/36 |
| | | | | 342/124 |
| 2004/0108951 A1* | 6/2004 | Edvardsson | .......... | G01F 23/284 |
| | | | | 342/124 |
| 2015/0048963 A1* | 2/2015 | Dieterle | ................ | G01F 23/284 |
| | | | | 342/5 |
| 2015/0122013 A1* | 5/2015 | Lenk | ..................... | G01F 23/284 |
| | | | | 73/290 V |
| 2017/0219408 A1* | 8/2017 | Dieterle | .................... | G01S 7/02 |
| 2017/0284854 A1* | 10/2017 | Skowaisa | .............. | G01S 7/4026 |

\* cited by examiner

LIQUID LEVEL SENSING APPARATUS FOR LONG-DISTANCE AUTOMATICALLY ENHANCING SIGNAL-TO-NOISE RATIO

BACKGROUND OF THE INVENTION

Field of the Invention

The present invention relates to a liquid level sensing apparatus, and especially relates to a liquid level sensing apparatus for long-distance automatically enhancing a signal-to-noise ratio.

Description of the Related Art

FIG. 7 shows the first embodiment of the related art liquid level sensing apparatus. A related art liquid level sensing apparatus 50 is arranged on a tank 40. The tank 40 comprises a material entrance 402 and a discharge hole 404. A measured target 20 is arranged in the tank 40. The related art liquid level sensing apparatus 50 transmits a sensing signal 108 to the measured target 20. The sensing signal 108 touches the measured target 20 to reflect back a reflected signal 110. The related art liquid level sensing apparatus 50 receives the reflected signal 110 to measure a signal-to-noise ratio and to measure a distance between the measured target 20 and the related art liquid level sensing apparatus 50. The measured target 20 is, for example but not limited to, grains, gravels or plastic pellets, and so on. The related art liquid level sensing apparatus 50 shown in FIG. 7 is not arranged horizontally, so that the quality of the reflected signal 110 is bad and the reflected signal 110 is not determined easily thus causing incorrect detection, as shown in the upper waveform diagram of FIG. 8.

FIG. 9 shows the second embodiment of the related art liquid level sensing apparatus. The description for the elements shown in FIG. 9, which are similar to those shown in FIG. 7, is not repeated here for brevity. Comparing to the related art liquid level sensing apparatus 50 shown in FIG. 7, the related art liquid level sensing apparatus 50 shown in FIG. 9 is arranged horizontally, but reflecting surfaces of the measured target 20 are uncertainty geometric surfaces thus also causing incorrect detection easily, as shown in the upper waveform diagram of FIG. 10.

FIG. 11 shows the third embodiment of the related art liquid level sensing apparatus. The description for the elements shown in FIG. 11, which are similar to those shown in FIG. 7, is not repeated here for brevity. The measured target 20 shown in FIG. 11 is the ocean or the river and so on. As shown in FIG. 12, the interference signal 114 is too large, but the correct reflected signal 110 is smaller thus causing incorrect detection, as shown in the upper waveform diagram of FIG. 12.

FIG. 13 shows a radiation field pattern of the related art liquid level sensing apparatus. The correct reflected signal 110 received by the related art liquid level sensing apparatus 50 is weaker, but the noise 116 is stronger. The related art liquid level sensing apparatus 50 has wide beam angles and incorrect radiation angles. The signal-to-noise ratio is only 5 dB.

SUMMARY OF THE INVENTION

In order to solve the above-mentioned problems, an object of the present invention is to provide a liquid level sensing apparatus for long-distance automatically enhancing a signal-to-noise ratio.

In order to achieve the object of the present invention mentioned above, the liquid level sensing apparatus is applied to a measured target. The liquid level sensing apparatus includes a sensing module, a long-distance command receiving module and at least a brake module. The sensing module transmits a sensing signal to the measured target. The sensing signal touches the measured target to reflect back a reflected signal. The sensing module receives the reflected signal to measure the signal-to-noise ratio and to measure a height of the measured target. The long-distance command receiving module is electrically connected to the sensing module. The long-distance command receiving module receives a long-distance command signal. The brake module is mechanically connected to the sensing module. The brake module is automatically adjusted in accordance with the reflected signal, so that the signal-to-noise ratio measured by the sensing module is maintained in a predetermined value.

The present invention automatically adjusts the quality of the signal by wireless or self-feedback mechanisms.

DETAILED DESCRIPTION OF THE INVENTION

Figure 1:
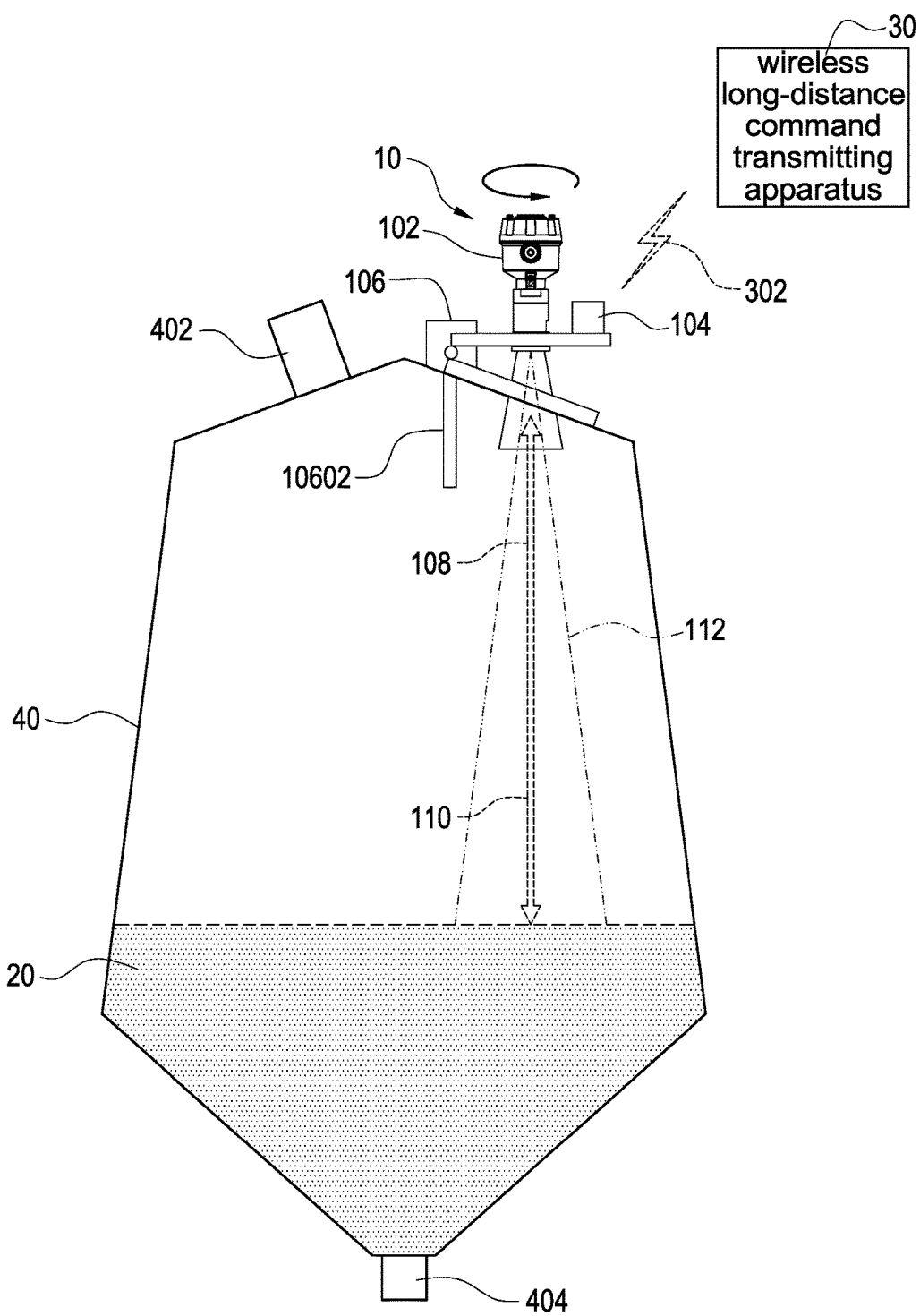
FIG. 1 shows the first embodiment of the liquid level sensing apparatus of the present invention.

FIG. 1 shows the first embodiment of the liquid level sensing apparatus of the present invention. A liquid level sensing apparatus 10 for long-distance automatically enhancing a signal-to-noise ratio is applied to a measured target 20, a wireless long-distance command transmitting apparatus 30 and a tank 40. The liquid level sensing apparatus 10 includes a sensing module 102, a long-distance command receiving module 104 and at least a brake module 106. The tank 40 comprises a material entrance 402 and a discharge hole 404. The brake module 106 comprises a protection mechanism 10602. The measured target 20 shown in FIG. 1 is, for example but not limited to, grains, gravels or plastic pellets, and so on.

The sensing module 102 transmits a sensing signal 108 to the measured target 20. The sensing signal 108 touches the measured target 20 to reflect back a reflected signal 110. The sensing module 102 receives the reflected signal 110 to measure the signal-to-noise ratio and to measure a height of the measured target 20. The long-distance command receiving module 104 is electrically connected to the sensing module 102. The long-distance command receiving module 104 receives a long-distance command signal 302 transmitted by the wireless long-distance command transmitting apparatus 30. The brake module 106 is automatically adjusted in accordance with the reflected signal 110, so that the signal-to-noise ratio measured by the sensing module 102 is maintained in a predetermined value. The predetermined value is the optimized signal-to-noise ratio. The long-distance command receiving module 104 can receive the long-distance command signal 302 through wires as well.

The brake module 106 is mechanically connected to the sensing module 102. The brake module 106 adjusts the sensing module 102 to dynamically follow the measured target 20, so that the sensing module 102 detects and calculates with 360 degrees to obtain the optimized reflected signal 110. The brake module 106 comprises, for example but not limited to, gears (not shown in FIG. 1), rollers (not shown in FIG. 1), bearings (not shown in FIG. 1), screws (not shown in FIG. 1), connecting rods (not shown in FIG. 1) and motors (not shown in FIG. 1), and so on, to achieve the purpose of adjusting the sensing module 102.

A signal range 112 shows a radiation direction of an antenna (not shown in FIG. 1) of the sensing module 102 and shows a material detection range. The protection mechanism 10602 protects the sensing module 102 to avoid the sensing module 102 being damaged in a specific operating environment. A power source of the brake module 106 is, for example but not limited to, the commercial power, batteries, solar power, wind power, recycled water power, recycled vibration power or recycled magnetostrictive effect.

Figure 8:
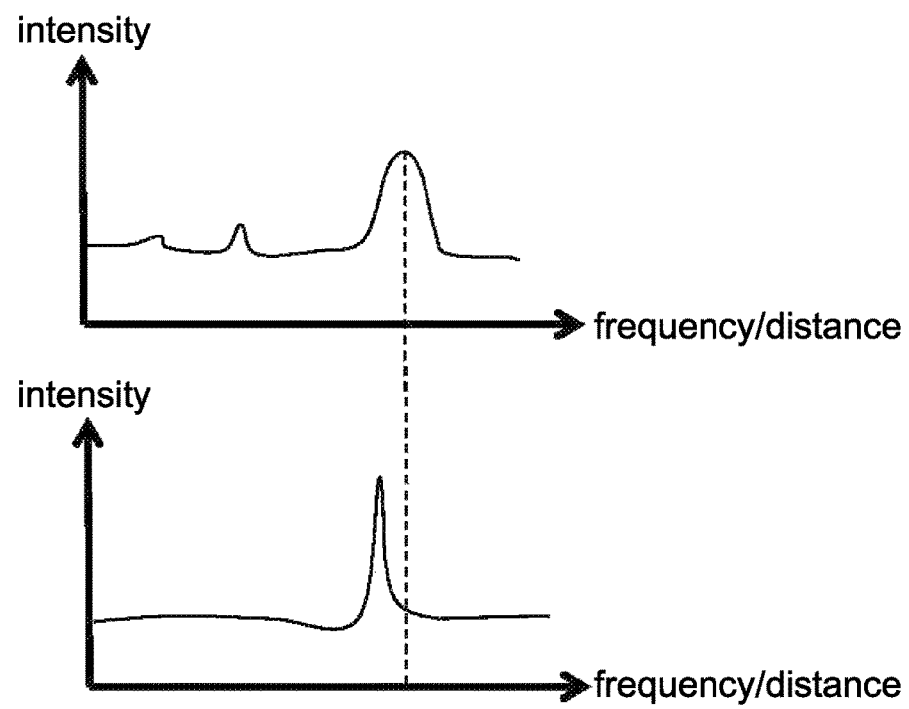
FIG. 8 shows waveform diagrams of the first embodiment of the related art liquid level sensing apparatus versus the first embodiment of the liquid level sensing apparatus of the present invention.
Figure 9:
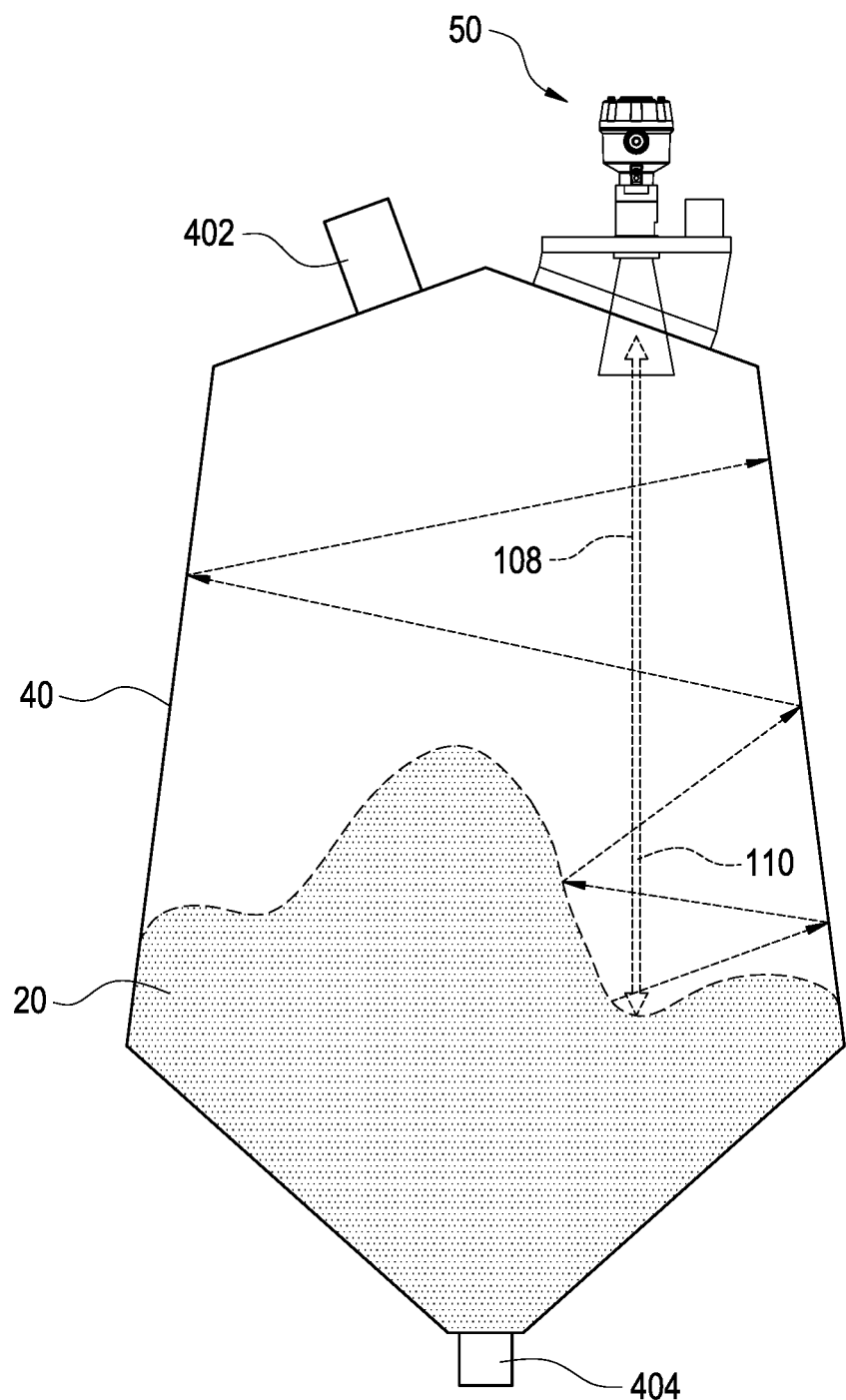
FIG. 9 shows the second embodiment of the related art liquid level sensing apparatus.

FIG. 8 shows waveform diagrams of the first embodiment of the related art liquid level sensing apparatus versus the first embodiment of the liquid level sensing apparatus of the present invention. The lower waveform diagram of FIG. 8 is the waveform diagram of the first embodiment of the liquid level sensing apparatus 10 of the present invention. Comparing to the upper waveform diagram of FIG. 8, the sensing module 102 of the present invention can correctly measure the height of the measured target 20.

The long-distance command receiving module 104 can be an open loop control long-distance command receiving module or a close loop control long-distance command receiving module, which are described in details as following:

If the long-distance command receiving module 104 is the open loop control long-distance command receiving module, in a specific unit time, the long-distance command receiving module 104 obtains the reflected signal 110 which has real-time optimized signal-to-noise ratio by a predetermined adjusting method. The predetermined adjusting method is changed in accordance with the process requirement of the measuring environment by pre-setting the gesture patterns. Or, the predetermined adjusting method uses the random uncertainty scanning scheme and adjusts according to the specific setting mode (for example, controlling the angle of the antenna to be changed from 0 degree to 10 degrees by gestures, or controlling the noise suppression mechanism to be folded).

Figure 4:
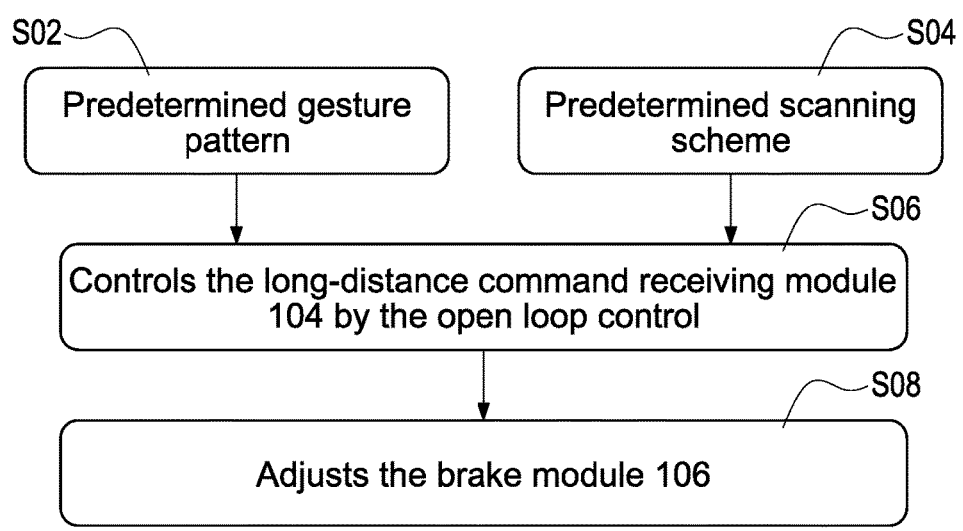
FIG. 4 shows a flow chart of the open loop control of the present invention.

FIG. 4 shows the concept mentioned above. FIG. 4 shows a flow chart of the open loop control of the present invention. FIG. 4 comprises following steps:
Step S02: Predetermined gesture pattern.
Step S04: Predetermined scanning scheme.
Step S06: Controls the long-distance command receiving module 104 by the open loop control.
Step S08: Adjusts the brake module 106.

If the long-distance command receiving module 104 is the close loop control long-distance command receiving module, in the specific unit time, the signal-to-noise ratio is used as a feedback signal to be a reference value for the long-distance command receiving module 104 in the next of the specific unit time, to obtain the reflected signal 110 which has the real-time optimized signal-to-noise ratio.

Figure 5:
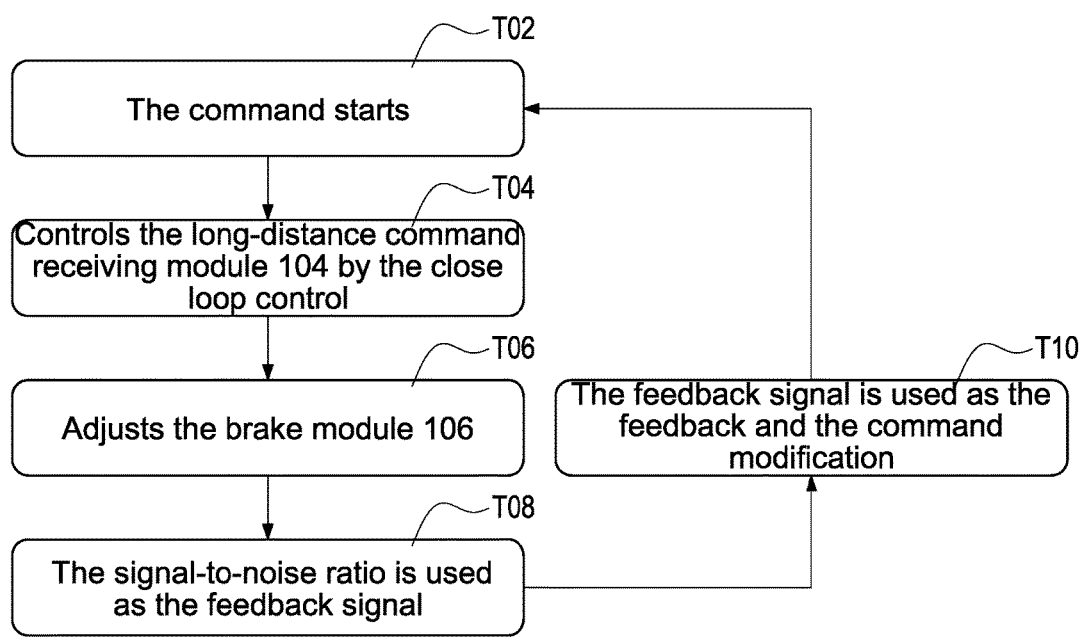
FIG. 5 shows a flow chart of an embodiment of the close loop control of the present invention.

FIG. 5 shows the concept mentioned above. FIG. 5 shows a flow chart of an embodiment of the close loop control of the present invention. FIG. 5 comprises following steps:
Step T02: The command starts.
Step T04: Controls the long-distance command receiving module 104 by the close loop control.
Step T06: Adjusts the brake module 106.
Step T08: The signal-to-noise ratio is used as the feedback signal.
Step T10: The feedback signal is used as the feedback and the command modification.

In another embodiment, if the long-distance command receiving module 104 is the close loop control long-distance command receiving module, in the specific unit time, an environmental trigger which is obtained is used as the feedback signal to be the reference value for the long-distance command receiving module 104 in the next of the specific unit time, to obtain the reflected signal 110 which has the real-time optimized signal-to-noise ratio. The environmental trigger is an external control start input/output (I/O) signal (for examples, the blender, heater, conveying apparatus, tidal warning, user scene input), a sensed analog signal (for examples, the over temperature warning, pressure overload) or digital signals of the control interface.

Figure 6:
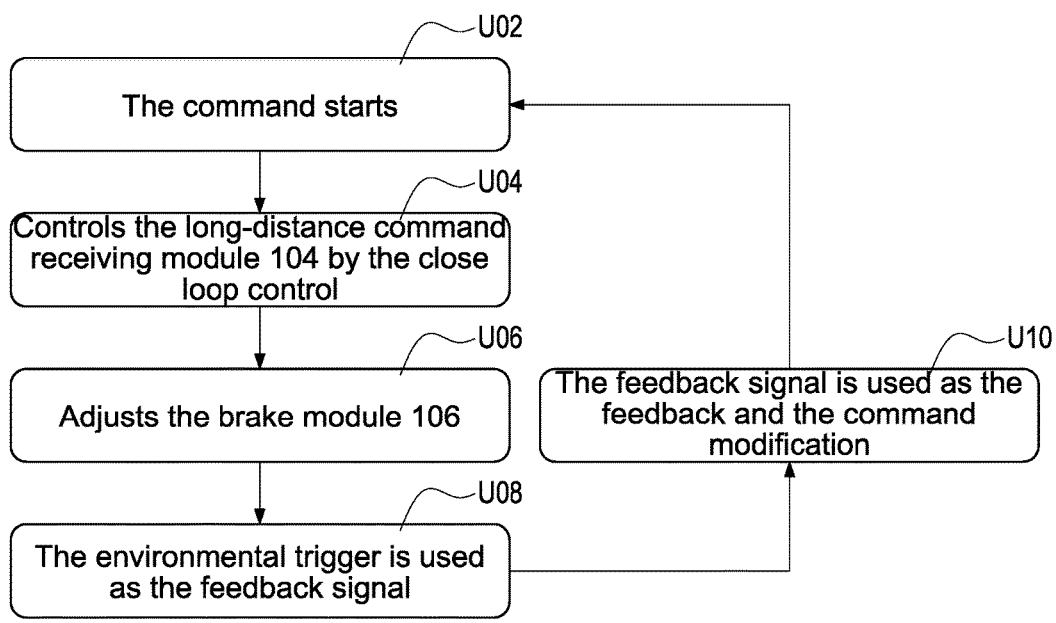
FIG. 6 shows a flow chart of another embodiment of the close loop control of the present invention.
Figure 7:
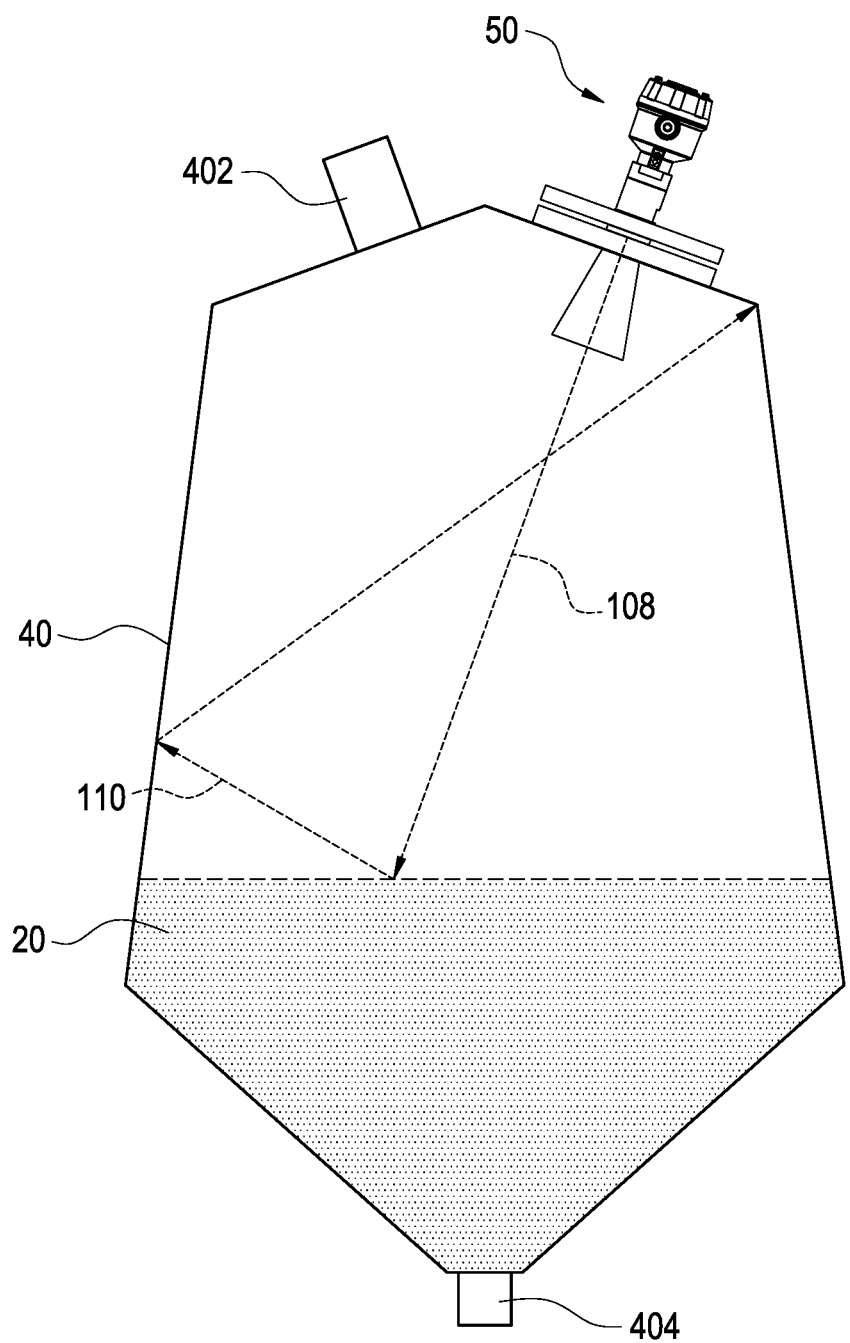
FIG. 7 shows the first embodiment of the related art liquid level sensing apparatus.

FIG. 6 shows the concept mentioned above. FIG. 6 shows a flow chart of another embodiment of the close loop control of the present invention. FIG. 6 comprises following steps:
Step U02: The command starts.
Step U04: Controls the long-distance command receiving module 104 by the close loop control.
Step U06: Adjusts the brake module 106.
Step U08: The environmental trigger is used as the feedback signal.
Step U10: The feedback signal is used as the feedback and the command modification.

Figure 2:
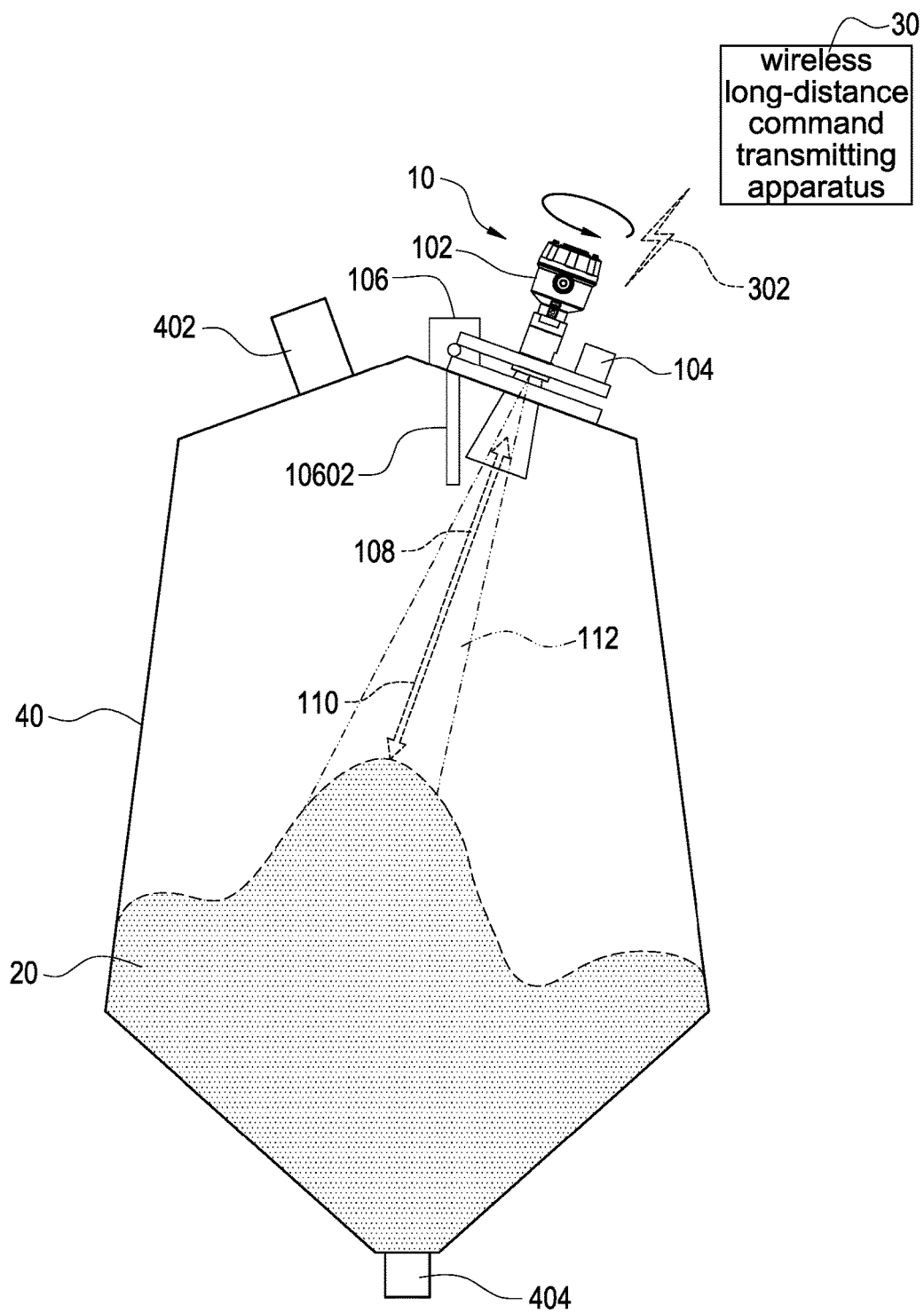
FIG. 2 shows the second embodiment of the liquid level sensing apparatus of the present invention.

FIG. 2 shows the second embodiment of the liquid level sensing apparatus of the present invention. The description for the elements shown in FIG. 2, which are similar to those shown in FIG. 1, is not repeated here for brevity. FIG. 2 shows that the brake module 106 adjusts the sensing module 102 to obtain the optimized reflected signal 110 to correctly measure the height of the measured target 20.

Figure 10:
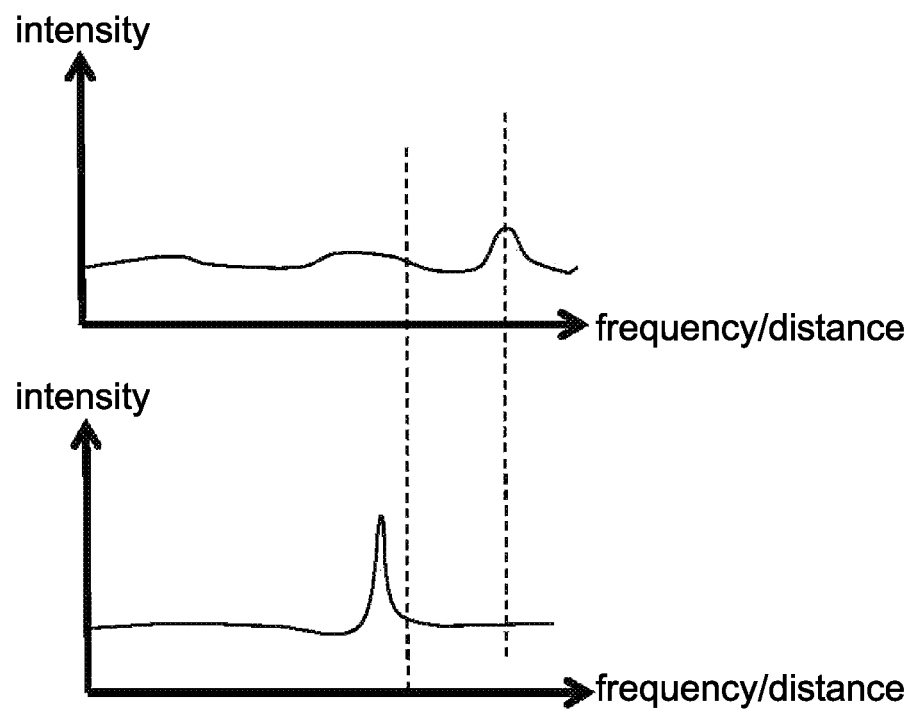
FIG. 10 shows waveform diagrams of the second embodiment of the related art liquid level sensing apparatus versus the second embodiment of the liquid level sensing apparatus of the present invention.

FIG. 10 shows waveform diagrams of the second embodiment of the related art liquid level sensing apparatus versus the second embodiment of the liquid level sensing apparatus of the present invention. The lower waveform diagram of FIG. 10 is the waveform diagram of the second embodiment of the liquid level sensing apparatus 10 of the present invention. Comparing to the upper waveform diagram of FIG. 10, the sensing module 102 of the present invention can correctly measure the height of the measured target 20.

Figure 3:
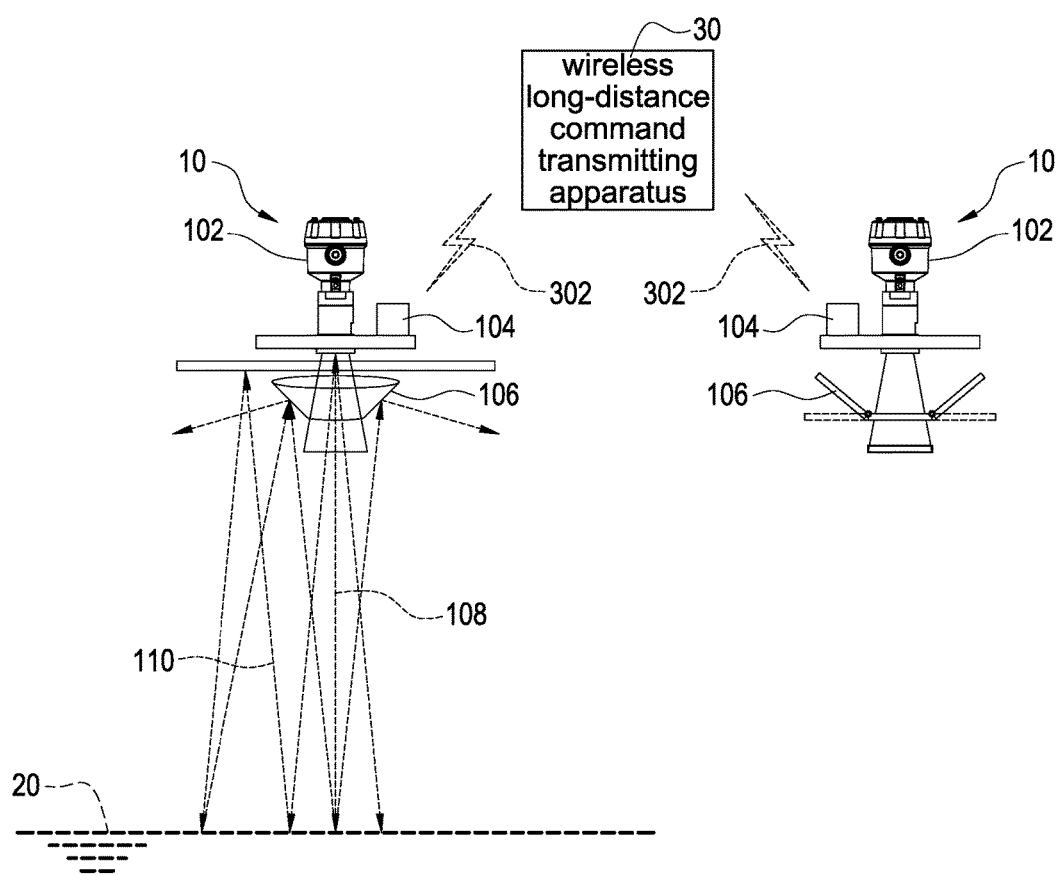
FIG. 3 shows the third embodiment of the liquid level sensing apparatus of the present invention.
Figure 11:
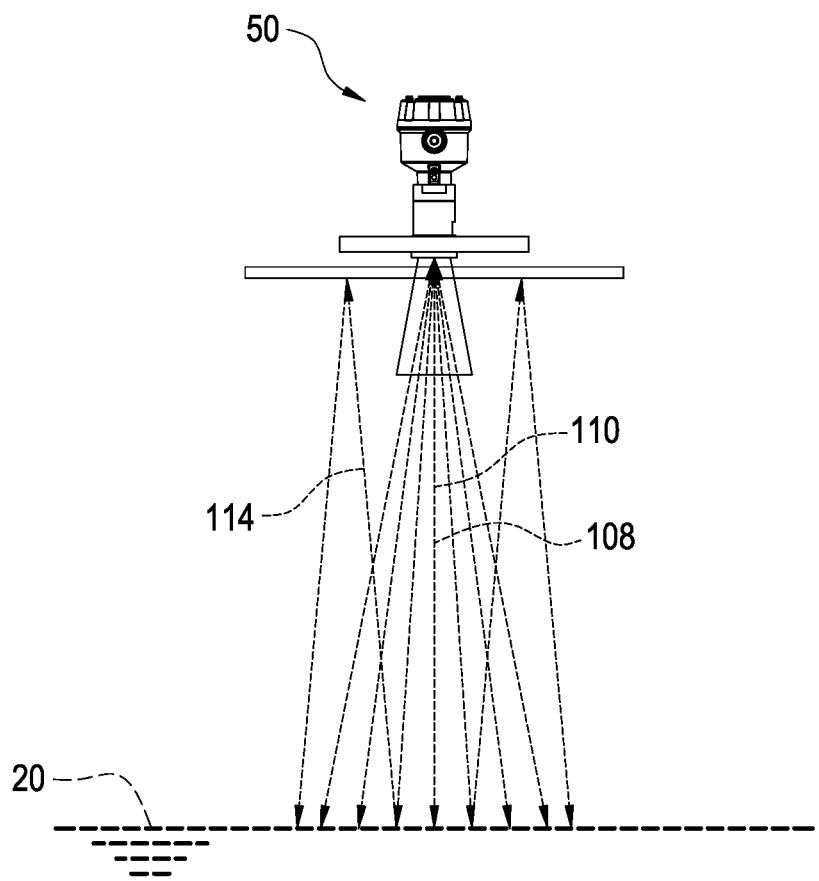
FIG. 11 shows the third embodiment of the related art liquid level sensing apparatus.

FIG. 3 shows the third embodiment of the liquid level sensing apparatus of the present invention. The description for the elements shown in FIG. 3, which are similar to those shown in FIGS. 1~2, is not repeated here for brevity. Moreover, the brake module 106 is adjusted, so that the sensing module 102 obtains the lowest noise, and a beam angle of the sensing signal 108 is adjusted. The measured target 20 shown in FIG. 3 is, for example but not limited to, the ocean or the river and so on. The liquid level sensing apparatus 10 shown in the left side of FIG. 3 is equal to the liquid level sensing apparatus 10 shown in the right side of FIG. 3, and the difference is that the brake module 106 of the liquid level sensing apparatus 10 shown in the right side of FIG. 3 is adjusted. Comparing to FIG. 11, some of the incorrect and useless reflected signals 110 are blocked by the brake module 106 or are reflected to other places.

Figure 12:
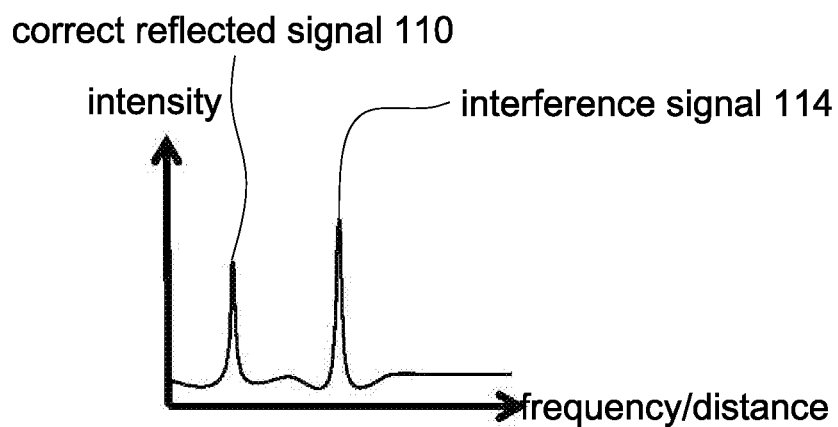
FIG. 12 shows waveform diagrams of the third embodiment of the related art liquid level sensing apparatus versus the third embodiment of the liquid level sensing apparatus of the present invention.
Figure 12:
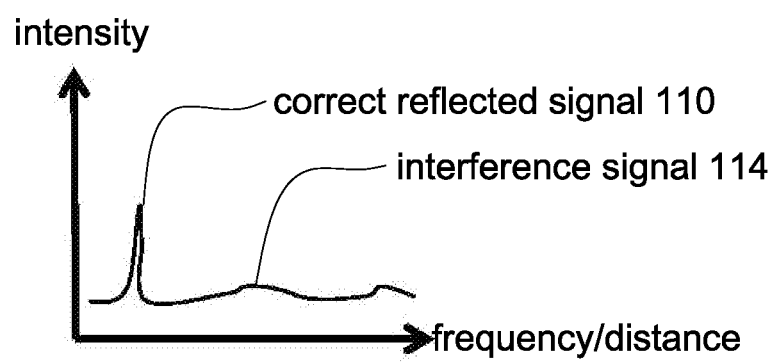
Figure 13:
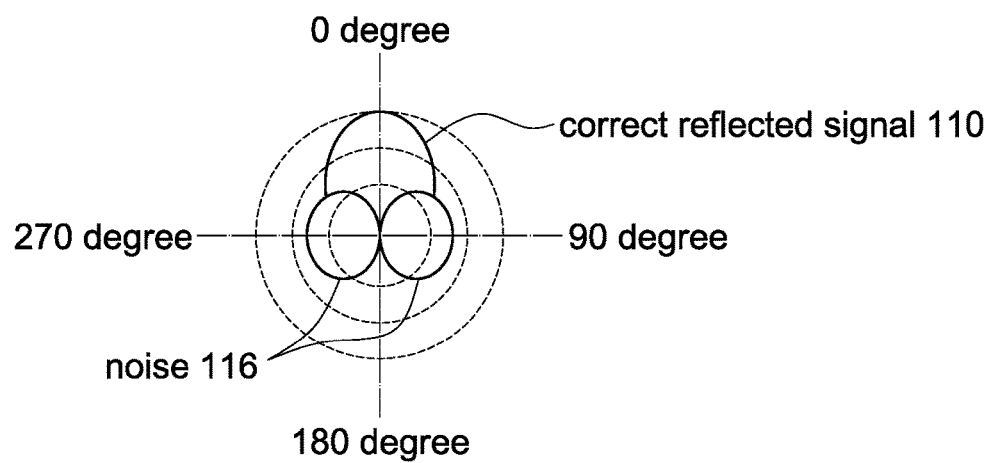
FIG. 13 shows a radiation field pattern of the related art liquid level sensing apparatus.

FIG. 12 shows waveform diagrams of the third embodiment of the related art liquid level sensing apparatus versus the third embodiment of the liquid level sensing apparatus of the present invention. The lower waveform diagram of FIG. 12 is the waveform diagram of the third embodiment of the liquid level sensing apparatus 10 of the present invention. Comparing to the upper waveform diagram of FIG. 12, an interference signal 114 is smaller, and the correct reflected signal 110 is larger, so that the sensing module 102 of the present invention can correctly measure the height of the measured target 20.

Figure 14:
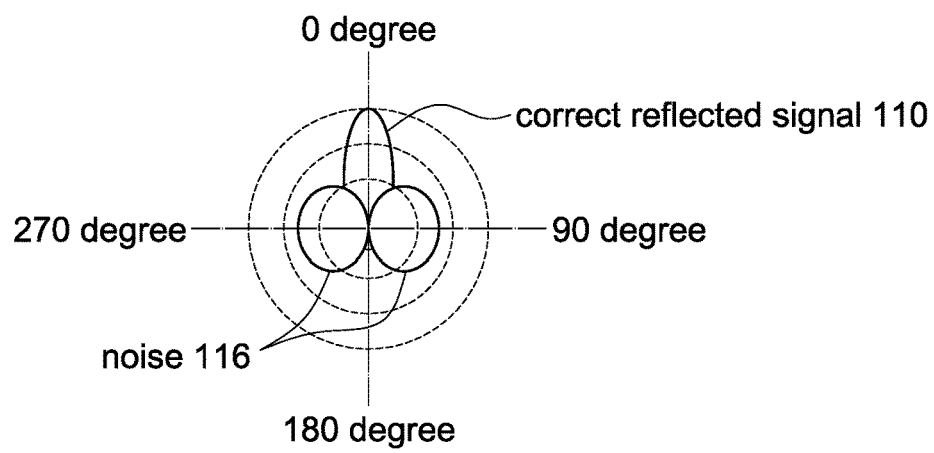
FIG. 14 shows radiation field patterns of the liquid level sensing apparatus of the present invention.
Figure 14:
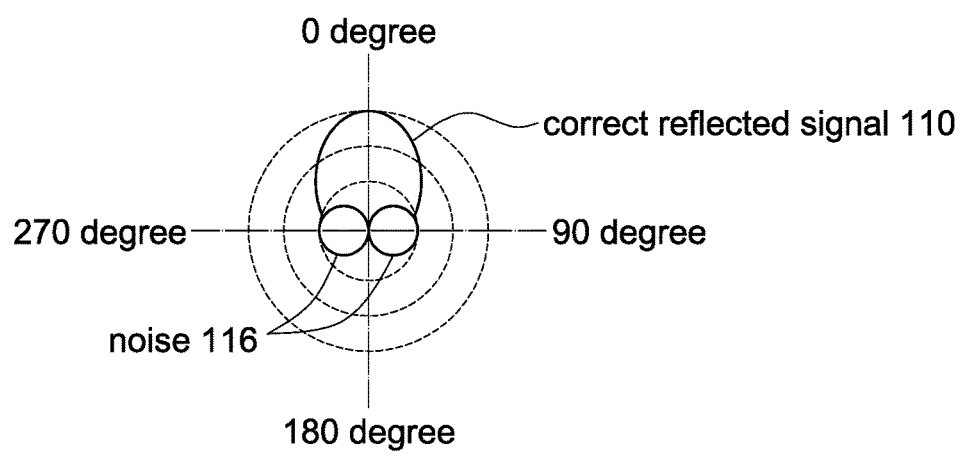
Figure 14:
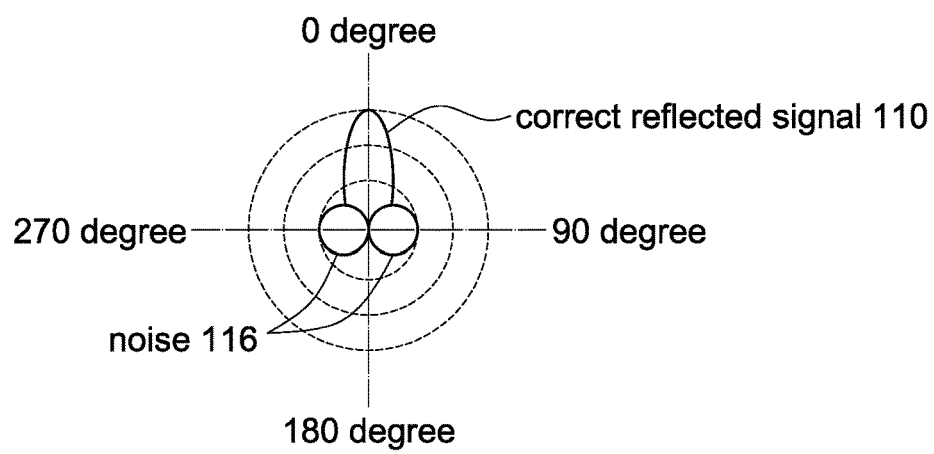

FIG. 14 shows radiation field patterns of the liquid level sensing apparatus of the present invention. The correct reflected signal 110 received by the liquid level sensing apparatus 10 is stronger but a noise 116 is weaker, and the liquid level sensing apparatus 10 has narrow beam angles and correct radiation angles. The signal-to-noise ratio even can be 40 dB.

Moreover, measuring the height of the measured target 20 mentioned above can comprise, for example but not limited to, following two meanings:

1. If the measured target 20 is arranged in the tank 40, measuring the height of the measured target 20 means measuring a material liquid level of the measured target 20.

2. If the measured target 20 is the ocean, measuring the height of the measured target 20 means measuring meters above sea level (namely, an altitude above sea level) of the measured target 20.

The present invention automatically adjusts the quality of the signal by wireless or self-feedback mechanisms. The present invention at least comprises following advantages:

1. The signal-to-noise ratio is optimized automatically.
2. The radiation field pattern is optimized.
3. Long-distance wireless controlling (auto-feedback).
4. Solves the problem that the user cannot operate in the environment.
5. Reduces the danger for the user.
6. 360 degrees continuous scan (can achieve tank 3D display radar data).

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A liquid level sensing apparatus (10) for long-distance automatically enhancing a signal-to-noise ratio applied to a measured target (20), the liquid level sensing apparatus (10) comprising:
    a sensing module (102), the sensing module (102) transmitting a sensing signal (108) to the measured target (20), the sensing signal (108) touching the measured target (20) to reflect back a reflected signal (110), the sensing module (102) receiving the reflected signal (110) to measure the signal-to-noise ratio and to measure a height of the measured target (20);
    a long-distance command receiving module (104) electrically connected to the sensing module (102), the long-distance command receiving module (104) receiving a long-distance command signal (302); and
    at least a brake module (106) mechanically connected to the sensing module (102), the brake module (106) being automatically adjusted in accordance with the reflected signal (110), so that the signal-to-noise ratio measured by the sensing module (102) is maintained in a predetermined value,
    wherein the long-distance command receiving module (104) is an open loop control long-distance command receiving module; in a specific unit time, the long-distance command receiving module (104) obtains the reflected signal (110) which has a real-time optimized signal-to-noise ratio by a predetermined adjusting method;
    wherein the predetermined adjusting method uses a random uncertainty scanning scheme and adjusts according to a specific setting mode.

2. The liquid level sensing apparatus (10) in claim 1, wherein the brake module (106) adjusts the sensing module (102) to dynamically follow the measured target (20), so that the sensing module (102) obtains an optimized reflected signal (110).

3. The liquid level sensing apparatus (10) in claim 1, wherein the brake module (106) is adjusted, so that the sensing module (102) obtains a lowest noise, and a beam angle of the sensing signal (108) is adjusted.

4. The liquid level sensing apparatus (10) in claim 2, wherein the brake module (106) comprises a protection mechanism (10602); the protection mechanism (10602) protects the sensing module (102) to avoid the sensing module (102) being damaged in a specific operating environment.

5. The liquid level sensing apparatus (10) in claim 1, wherein the long-distance command receiving module (104) wirelessly receives the long-distance command signal (302); a power source of the brake module (106) is a commercial power, batteries, a solar power, a wind power, a recycled water power, a recycled vibration power or a recycled magnetostrictive effect.

* * * * *